(12) United States Patent
O'Herlihy et al.

(10) Patent No.: US 10,740,856 B2
(45) Date of Patent: Aug. 11, 2020

(54) DYNAMIC SUPPORT INFORMATION BASED ON CONTEXTUAL INFORMATION

(71) Applicant: Uber Technologies, Inc., San Francisco, CA (US)

(72) Inventors: Michael O'Herlihy, San Francisco, CA (US); Meron Alon, San Francisco, CA (US); Karna Chokshi, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 639 days.

(21) Appl. No.: 15/583,787

(22) Filed: May 1, 2017

(65) Prior Publication Data
US 2018/0315139 A1    Nov. 1, 2018

(51) Int. Cl.
*G06Q 30/00* (2012.01)
*G06Q 50/14* (2012.01)

(52) U.S. Cl.
CPC ........... *G06Q 50/14* (2013.01); *G06Q 30/016* (2013.01)

(58) Field of Classification Search
None
See application file for complete search history.

(56) References Cited

U.S. PATENT DOCUMENTS

| 10,423,991 | B1 * | 9/2019 | Jeon | G06N 20/00 |
| 2002/0103693 | A1 | 8/2002 | Bayer et al. | |
| 2007/0027806 | A1 | 2/2007 | Sands et al. | |
| 2012/0303392 | A1 | 11/2012 | Depura et al. | |
| 2015/0088335 | A1 | 3/2015 | Lambert et al. | |
| 2016/0042303 | A1 * | 2/2016 | Medina | G01C 21/3438 705/5 |
| 2016/0117928 | A1 | 4/2016 | Hodges et al. | |
| 2016/0364679 | A1 * | 12/2016 | Cao | G06Q 10/083 |
| 2017/0124506 | A1 * | 5/2017 | Khan | G06Q 10/063112 |
| 2017/0200321 | A1 * | 7/2017 | Hummel | G06Q 30/0609 |

OTHER PUBLICATIONS

"Uber says monitoring drivers improves safety, but drivers have mixed views", Mary Wisniewski, Dec. 2016 (Year: 2016).*
"Uber's app will soon begin tracking driver behavior", Douglas MacMillan, Jun. 2016 (Year: 2016).*
"Ride-sharing apps test tracking of drivers", Douglas MacMillan, Jan. 2016 (Year: 2016).*
PCT International Search Report and Written Opinion, PCT Application No. PCT/IB2018/053000, dated Aug. 22, 2018, 12 pages.

* cited by examiner

*Primary Examiner* — Dennis W Ruhl

(74) *Attorney, Agent, or Firm* — Fenwick & West LLP

(57) ABSTRACT

A server provides a customized support interface to a user that is requesting assistance regarding a service that the user received. The server provides a support interface that is customized for the user based on data related to the service and the user's past behavior. By providing a customized support interface, the user is more easily able to report any grievances that the user may have had with the service thereby reducing any further user aggravation.

18 Claims, 11 Drawing Sheets

304

307

Your last trip

2/9/17, 9:51 AM                                   $8.94
Honda Civic   DW12474

309 My promo code was not applied          >

311 Driver picked me up late                >

313 I was dropped off at the wrong location   >

315 Driver sped during the trip             >

317 Show more options                       >

308

Your last trip

2/9/17, 9:51 AM                                          $8.94
Honda Civic  DW12474

319 I was dropped off at the wrong location      >

321 My promo code was not applied                 >

323 Driver picked me up late                            >

325 Driver sped during the trip                         >

317 Show more options                                    >

DYNAMIC SUPPORT INFORMATION BASED ON CONTEXTUAL INFORMATION

BACKGROUND

The described embodiments generally relate to customer service interactions, and more particularly to providing dynamic support information based on user contextual information.

Current service provider systems provide users with a service in exchange for compensation. When a user encounters a problem related to the service, current service provider systems provide a platform to the user that allows the user to report the problem. For example, the platform can be a help menu that includes different support options that the user can select from to report the problem. However, the user may become overwhelmed by the number of support options available in the help menu thereby compounding a negative experience for the user.

SUMMARY

A server provides a customized support interface to a user that is requesting assistance regarding a service that the user received. The server stores events (e.g., context information) related to the service provided to the user. Rather than provide to the user a standard support interface that is generic to all users, the server provides a support interface that is customized for the user based on the events related to the service. By providing a customized support interface, the user is more easily able to report any grievances that they user may have had with the service thereby reducing any further user aggravation.

The features and advantages described in this summary and the following detailed description are not all inclusive. Many additional features and advantages will be apparent to one of ordinary skill in the art in view of the drawings, specification and claims.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes a map server that provides a customized support interface to a user that is requesting assistance regarding a service that the user received. The map server stores events related to the service provided to the user. For example, if the service received by the user is a driving service, the map server may store various types of events related to the driving service such as telematics events, global positioning system (GPS) events, and credit card events.

Rather than provide to the user a standard support interface that is generic to all users, the map server considers the events associated with the driving service when providing the support interface. In one embodiment, the map server provides a support interface that is customized for the user based on the events related to the driving service that the user received. By providing a customized support interface, the user is more easily able to report any grievances that the user may have encountered with the driving service thereby reducing any further user aggravation.

I. System Overview

Figure 1:
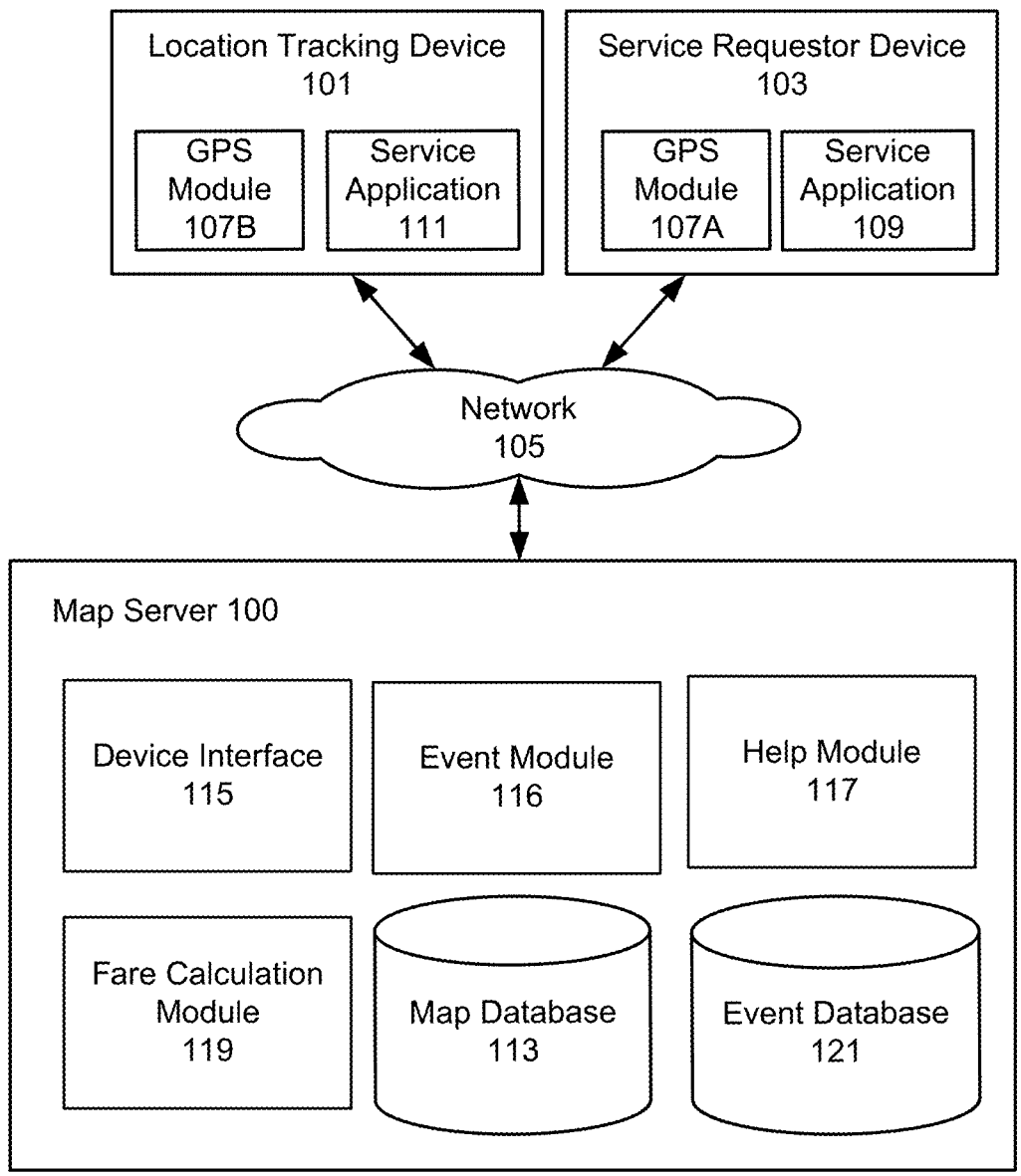
FIG. 1 illustrates a system environment in accordance with one embodiment.

FIG. 1 is a diagram of a system environment for a network system 100 according to one embodiment. Users of the network system 100 may include providers that provide a service to other users. In an example use case, a provider operates a vehicle to transport a user from a first location (e.g., an origin or pickup location) to a second location (e.g., a drop-off location). Other types of service include, for example, delivery of goods (e.g., mail, packages, or consumable items) or services. Although the embodiments herein for providing a customized support interface are described with respect to a driver service, the embodiments herein can be applied to any type of service that requires a support interface that allows users to report issues encountered with a service.

FIG. 1 illustrates a detailed view of modules within a map server 100, a location tracking device 101, and a service requestor device 103 according to one embodiment. Some embodiments of the map server 100, the location tracking device 101, and the service requestor device 103 have different modules than those described here. Similarly, the functions can be distributed among the modules in a different manner than is described here. As used herein, the term "module" refers to computer program logic used to provide the specified functionality. Thus, a module can be implemented in hardware, firmware, and/or software.

In one embodiment, the map server 100 implements a network service, such as an arrangement service, which enables services to be arranged between parties such as between the users of the location tracking device 101 and the service requestor device 103. As described herein, a location tracking device 101 can correspond to a mobile computing device, such as a smartphone, that is operated by a service provider, such as a driver of a vehicle, or can correspond to an on-board computing system of a vehicle. The map server 100 can also correspond to a set of servers, in some examples, and can operate with or as part of another system that implements network services.

An example of the services includes arranging a transport service or a delivery service between a service requestor and a service provider. In the context of the discussion herein, an operator of a transportation vehicle (e.g., the service provider) provides the service of transporting a person (e.g., the service requestor) to a destination requested by the person. In one embodiment, transportation vehicles include vehicles such as cars and motorcycles, as well as public transportation vehicles such as trains, light rail, buses, etc.

In one embodiment, the transportation of a person from a starting location to a destination location is referred to as a trip or a transport service. Generally, the map server 100 calculates fares for transport services. A fare is a monetary payment from a service requestor to a service provider in exchange for the service provider transporting the service requestor to a destination location. The map server 100 may calculate the fare for a transport service based on the distance traveled during the trip (and/or based on a duration of the trip, any applicable tolls, fees, etc.). The map server 100 determines the distance traveled during the transport service using geographic information received from the location tracking device 101 (e.g., such as after completion of the transport service).

The map server 100 receives (e.g., periodically) geographic information from a location tracking device 101 included in a transportation vehicle as the transportation vehicle moves its position. The geographic information includes geographic points that describe a trip of the transportation vehicle. In one embodiment, the geographic information is global positioning system (GPS) information. Throughout the description, geographic information is referred to as "GPS data" or "GPS points," but the description herein can be applied to any other type of geographic coordinate system.

As shown in FIG. 1, the map server 100 is in communication with the location tracking device 101 and the service requestor device 103 via a network(s) 105. In one embodiment, the network 105 is the Internet or any combination of a LAN, a MAN, a WAN, a mobile, wired or wireless network, a private network, or a virtual private network. While only a single location tracking device 101 and a single service requestor device 103 are shown in FIG. 1, any number of location tracking devices 101 can be in communication with the map server 100.

In one embodiment, the service requestor device 103 is an electronic device (e.g., a smart phone) of a person that requested a trip. The service requestor device 103 is used by the person to request a transport service from a starting location to a destination location via a service application 109 included in the service requestor device 103. The service application 109 allows the user of the service requestor device 103 to submit a transport service request, which the map server 100 then processes in order to select an operator of a transportation vehicle.

According to examples, the transport service request may include (i) a user identifier (ID), (ii) a pickup location (e.g., a location identifier specified by the user or a location identifier of the current position of the service requestor device 103 as determined by a GPS module 107A included in the service requestor device 103), (iii) a destination location, and/or (iv) a vehicle type. For example, the GPS module 107A uses sensors (e.g., a GPS receiver) included in the service requestor device 103 to determine the position of the service requestor device 103 at various instances in time. In one embodiment, the current position of the service requestor device 103 is represented by a location identifier such as latitude and longitude coordinates. The current position of the service requestor device 103 is also associated with a time stamp indicating the time and the date in which the GPS module 107A measured the current position of the service requestor device 103. Alternatively, the pickup location of the service requestor device 103 may be manually inputted into the service requestor device 103 by the user of the device 103, such as by selecting a location on a map or in the form of an address including at least a street number and street name.

The arrangement service, which is implemented by the map server 100 and/or other servers or systems, can receive the transport service request over the network 105 and can select an operator or service provider for the requestor. In one example, the arrangement service can (i) identify a pool of service providers that are available to provide the requested service and satisfy one or more conditions (e.g., have the specified vehicle type, and/or are within a predetermined distance or estimated travel time away from the pickup location), (ii) select a service provider from the pool of service providers, and (iii) transmit an invitation to the location tracking device 101 of the service provider. The invitation can include the pickup location, so that the selected service provider can navigate to the pickup location for initiating the trip for the requestor. If the selected service provider accepts the invitation by providing input on the location tracking device 101, the map server 100 can notify the service requestor device 103 accordingly.

In one embodiment, the location tracking device 101 is an electronic device (e.g., a smart phone) located within the transportation vehicle used to complete trips. The location tracking device 101 includes a service application 111. The service application 111 displays, on the location tracking device 101, information about a trip that the service provider has agreed to provide, such as the pickup location, and/or navigation and/or mapping information instructing the service provider to travel to the pickup location. As referred to herein, the pickup location may be the current location of the service requestor device 103 or a location specified by the user of the service requestor device 103. The service application 111 may also display, on the location tracking device 101, the destination for the assigned trip if provided by the user of the service requestor application 111.

The location tracking device 101 includes a GPS module 107B. The GPS module 107B uses one or more sensors of the location tracking device 101 to identify GPS data of the transportation vehicle as the transportation vehicle moves along one or more roads to complete a trip. The GPS data of the transportation vehicle is representative of the transportation vehicle's position at different instances in time during a trip. For example, at time T1, the location tracking device 101 can be at a particular GPS location, identified by a location identifier (e.g., latitude and longitude coordinates) and a time stamp indicative of the time and date when the location tracking device 101 measured its current position. If the transportation vehicle is moving, at time T2 the location tracking device 101 can be at a different GPS location. In this manner, the location tracking device 101 periodically measures the current position of the transportation vehicle (e.g., every three seconds, every four seconds, etc.) and periodically provides GPS data that is representative of the position of the transportation vehicle over time to the map server 100. Alternatively, the location tracking device 101 may provide GPS data whenever new or updated measurements of the current position of the transportation vehicle are taken or are available.

Each of the service applications 111 and 109 respectively stored at the location tracking device 101 and the service requestor device 103 can include or use an application programming interface (API) to communicate data with the map server 100. The API can provide access to the map server 100 via secure access channels over the network 105 through any number of methods, such as web based forms, programmatic access via RESTful APIs, Simple Object Access Protocol (SOAP), remote procedure call (RPC), scripting access, etc., while also providing secure access methods including key-based access to ensure the map server 100 remains secure and only authorized users, service providers, and/or third parties can gain access to the map server 100

As shown in FIG. 1, the map server 100 comprises or is in communication with a map database 113. The map database 113 stores a variety of map spatial databases. Map spatial databases are queryable databases identifying different points (e.g., having a latitude and longitude, and/or an altitude) along paths of trips that a given transportation vehicle can use, and information about how the different points connect with other points. Some commercially available map spatial databases include points identifying locations of interests or landmarks.

With respect to vehicles, a vehicle map database can include points corresponding to locations on known road networks such as roadways, highways, freeways, etc. The vehicle map database may also include other information related to road networks, such as intersections, one way streets, how the different roads and streets connect to each other, etc. Similarly, with respect to airplanes, an airplane map system spatial database can include points corresponding to locations along flight paths and what points are boundaries for no flight zones, while for trains, a train's map system spatial database can include points corresponding to locations on railroads and railways, and where/how the railroads connect. Additional map databases can be created or modified in the map database 113 as a result of real life updates and changes.

As shown in FIG. 1, in one embodiment the map server 100 includes a device interface 115. The device interface 115 manages communications between the map server 100, and the location tracking device 101 and the service requestor device 103 over the network 105. The device interface 115 receives transport service requests from the service requestor device 103 and transmits invitations to the location tracking device 101. In addition, the device interface 115 receives transport service acceptances from the location tracking device 101 and routes notifications of the trip acceptances to the service requestor device 103. In one embodiment, the device interface 115 receives GPS data and/or state information about the service provider or service application 111 from the location tracking device 101 as the transportation vehicle moves to complete a transport service. The device interface 115 may also receive requests to report any user grievances experienced during a transport service, as described below.

The map server 100 also includes a fare calculation module 119. The fare calculation module 119 calculates fares for completed transport services. To calculate the fare, the fare calculation module 119 calculates the distance from the starting location of a transport service to the destination location of the transport service. For example, the fare calculation module 119 determines the distance in miles or meters from the starting location of the transport service to the destination location of the transport service. The fare calculation module 119 then determines the cost per distance traveled (e.g., cost per mile such as $1.30 per mile) for the transport service. The cost per distanced traveled is associated with the geographic location associated with the transport service. For example, the cost per distanced traveled for the San Francisco Bay Area, Calif. may be different than the cost per distance traveled for Los Angeles, Calif. The fare calculation module 119 multiplies the cost per distance traveled with the distance traveled to determine the distance component of the fare.

In one embodiment, the fare for a transport service is also based on the amount of time required to complete the transport service. The fare calculation module 119 may determine the amount of time it took to complete the transport service based on the time stamps associated with the GPS points received from the location tracking device 101 and multiples the time by a cost per time traveled (e.g., cost per minute) to calculate the time component of the fare. The cost per time traveled may also be dependent on the geographic location associated with the transport service trip or the time of day of the trip.

In one embodiment, the fare for a transport service is also associated with a base fare. The base fare is a bare minimum that the person that requested the trip will be charged for the trip. The fare calculation module 119 may add the distance component, the time component, and the base fare to determine the fare for the trip. The fare calculation module 119 then applies a payment method of the person that requested the trip (e.g., charges a credit card) and communicates the fare to the service application 109 of the service requestor device 103 of the person.

The map server 100 also includes an event database 121. The event database 121 stores event records associated with transport services arranged by the map server 100. Generally, each event record is associated with a particular transport service and describes an event that a user may have experienced during the transport service. For example, an event record for a trip may indicate an event that the transportation vehicle exceeded the speed limit during the transport service.

In one embodiment, each event described in an event record is associated with a customer support category in the event record. The map server 100 may store a list of customer support categories that collectively represent all known types of issues that a user may have encountered during a transport service. Each event in an event record is associated with one of the customer support categories in order to standardize the event in the event record, as will be described in further detail below. In the example above, the event that the transportation vehicle exceeded the speed limit may be associated with the customer support category of "Dangerous Driving—Speeding."

The event records are generated based on data received from various data sources. For example, one or more event records may be based on telematics data received from the location tracking device 101 and/or service requestor device 103. The telematics data may describe reckless driving events. Examples of reckless driving events include speeding events, accidents, harsh braking, or harsh accelerations. Note that the telematics data may describe other types of reckless driving events based on telematics data than those described herein.

The event records may also be based on GPS data received from the GPS modules 107A and 107B of the location tracking device 101 and/or service requestor device 103. The GPS data may describe GPS based events such as any pick-up issues and/or drop off issues during the transport service. One example of a pick-up issue is the user of the service requestor device 103 being picked up at a location that is different than the pick-up location specified in the trip request. Similarly, a drop-off issue describes the user of the service requestor device 103 being dropped off at a location that is different than the drop-off location specified in the trip request. The GPS data may also describe any toll related events such as the service provider unnecessarily taking a route that includes toll fees and/or an inefficient route taken by the service provider. The GPS data may also describe the total time it took for the service provider to complete a trip and an indication of whether the total time to complete the trip is longer than expected. The GPS data may also describe an event where the service provider stopped the trip prematurely. That is, the GPS data may indicate whether the trip ended before reaching the destination indicated in the trip request. The GPS data may also indicate any safety related events with respect to the service provider and the user of the location tracking device 101. The GPS data may also describe an event where the service requestor device 103 is left in the transportation vehicle of the service provider.

In one embodiment, an event record may also be based on phone records associated with the location tracking device 101 and/or service request device 103. An event based on a phone record may indicate whether the service provider associated with the location tracking device 101 is inappropriately contacting the user of the service requestor device 103 or vice versa.

In one embodiment, an event record may also be based on a media recording (e.g., audio and/or video) within the vehicle. The media recording may depict various events that occurred within the transportation vehicle such as any altercations (e.g., verbal and/or physical abuse) between the user of the service requestor device 103 and the service provider, whether the user of the service requestor device 103 left an item in the transportation vehicle, whether any non-navigation functions of location tracking device 101 were used by the service provider during the trip (e.g., was the service provider texting during the trip), and/or events requiring additional cleaning of the transportation vehicle.

In one embodiment, an event record may also be based on credit card information. Credit card information may describe payment events related to the transport service such as a promotion not being applied to pay for the transport service, the user being incorrectly charged for the transport service, and/or the fee for the transport service being different from the estimated fee provided to the user of the service requestor device 103 when the transport service was initially requested.

In one embodiment, the map server 100 includes an event module 116. The event module 116 generates the event records stored in the event database 121. The event module 115 receives events from the various data sources described above. The event module 115 is trained to map (e.g., categorize) each event to one of the customer support categories. For example, if the event module 116 receives telematics data indicating that the service provider was speeding during a transport service, the event module 116 may classify the telematics data into the customer support category of "dangerous driving—speeding" and generate an event record for the transport service indicating an event related to "dangerous driving—speeding." Once the event module 116 has classified the events for a transport service into one or more customer support categories, the event module 116 stores the events and their associated customer support categories into different event records in the event database 121.

In one embodiment, the event module 115 is trained to categorize events. The event module 115 uses machine learning (e.g., supervised or unsupervised machine learning) and a set of historical event records to learn how to correctly categorize events. Based on the training, the event module 115 can analyze newly received events and automatically map each event to one of the customer support categories.

The map server 100 also includes a help module 117. The help module 117 determines a customized support interface to provide to the service requestor device 103. The customized support interface allows a user of the service requestor device 103 to report issues that the user experienced during a transport service. As mentioned above, the customized support interface is provided to a user based on the events associated with a transport service received by the user. Rather than include generic customer support options that are applicable to all users regardless of the specific events that occurred during a transport service, the customized support interface includes customer support categories that are based on the events that occurred during the transport service received by the user. All other types of customer support categories can be moved to an "other" category. The process performed by the help module 117 for determining a customized support interface is described with respect to FIGS. 2-3.

Figure 2:
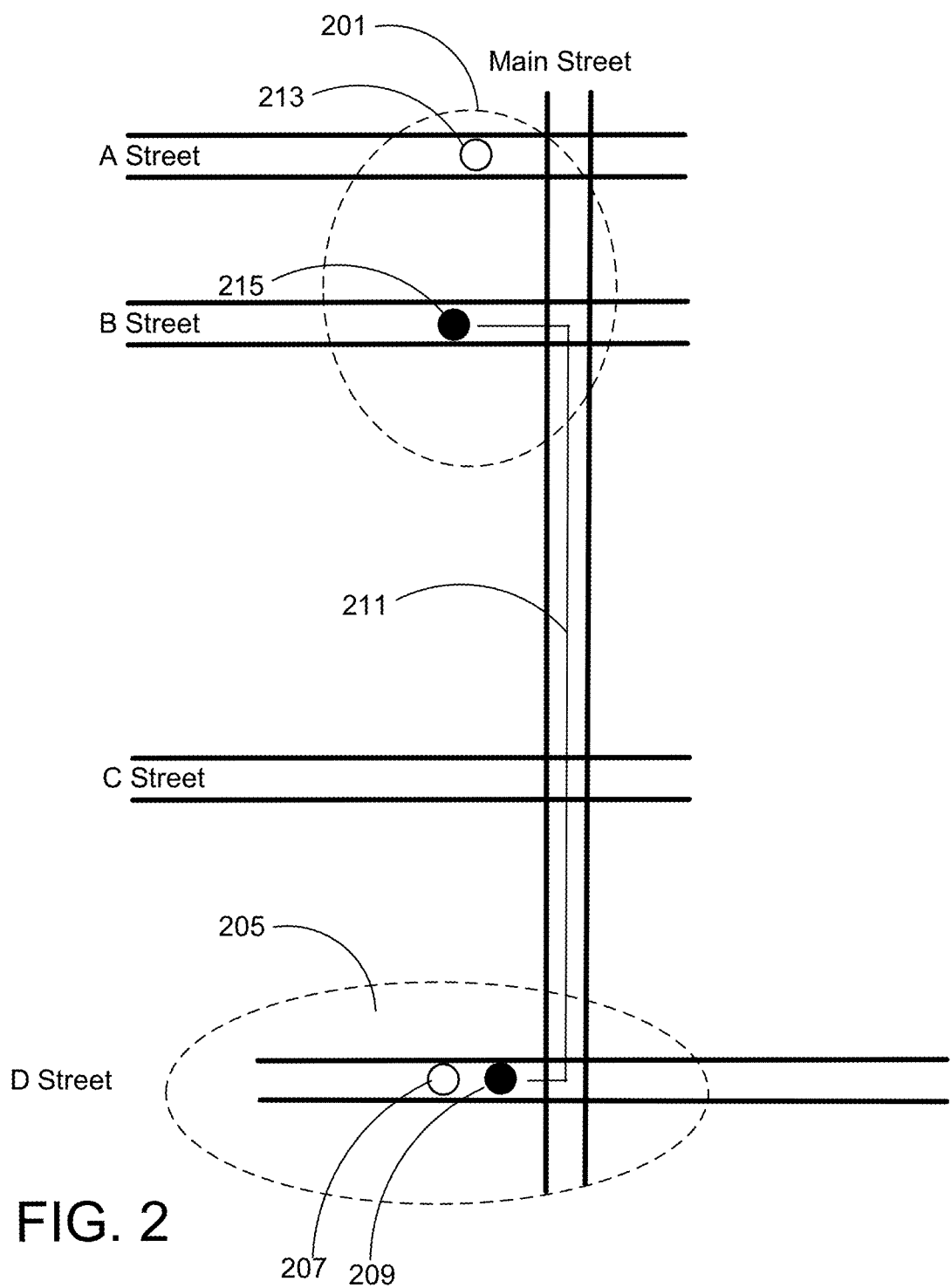
FIG. 2 illustrates details of a transport service according to one embodiment.

FIG. 2 illustrates details of a transport service according to one embodiment. In FIG. 2, area 205 represents the pickup location for the transport service. The pickup location 205 includes the user's desired pickup location 207 on D street that was specified in the service request. The pickup location 205 also illustrates the actual pickup location 209 on D street where the user was picked up for the transport service. In the example shown in FIG. 2, the user was picked up at the correct location. In one embodiment, the map server 100 determines that the user was picked up at the correct pickup location due to the actual pickup location being within a threshold distance that can be supplied by the implementer, e.g., 50 ft, from the pickup location specified on the service request. In FIG. 2, the path of the transportation vehicle used to complete the transport service is represented by line 211 and the arrow indicates the direction of the route.

Area 201 represents the drop off location for the transport service. The drop off location 213 represents the user's desired drop off location that was specified in the service request. In the example shown in FIG. 2, the drop off location 213 specified in the service request is on A street. However, the user was dropped off at the drop off location 215 on B street rather than on A street. Thus, the user was not dropped off at the correct drop off location. In one embodiment, the user may report the issue regarding being dropped off at the wrong drop off location via the customized support interface described below.

Figure 3A:
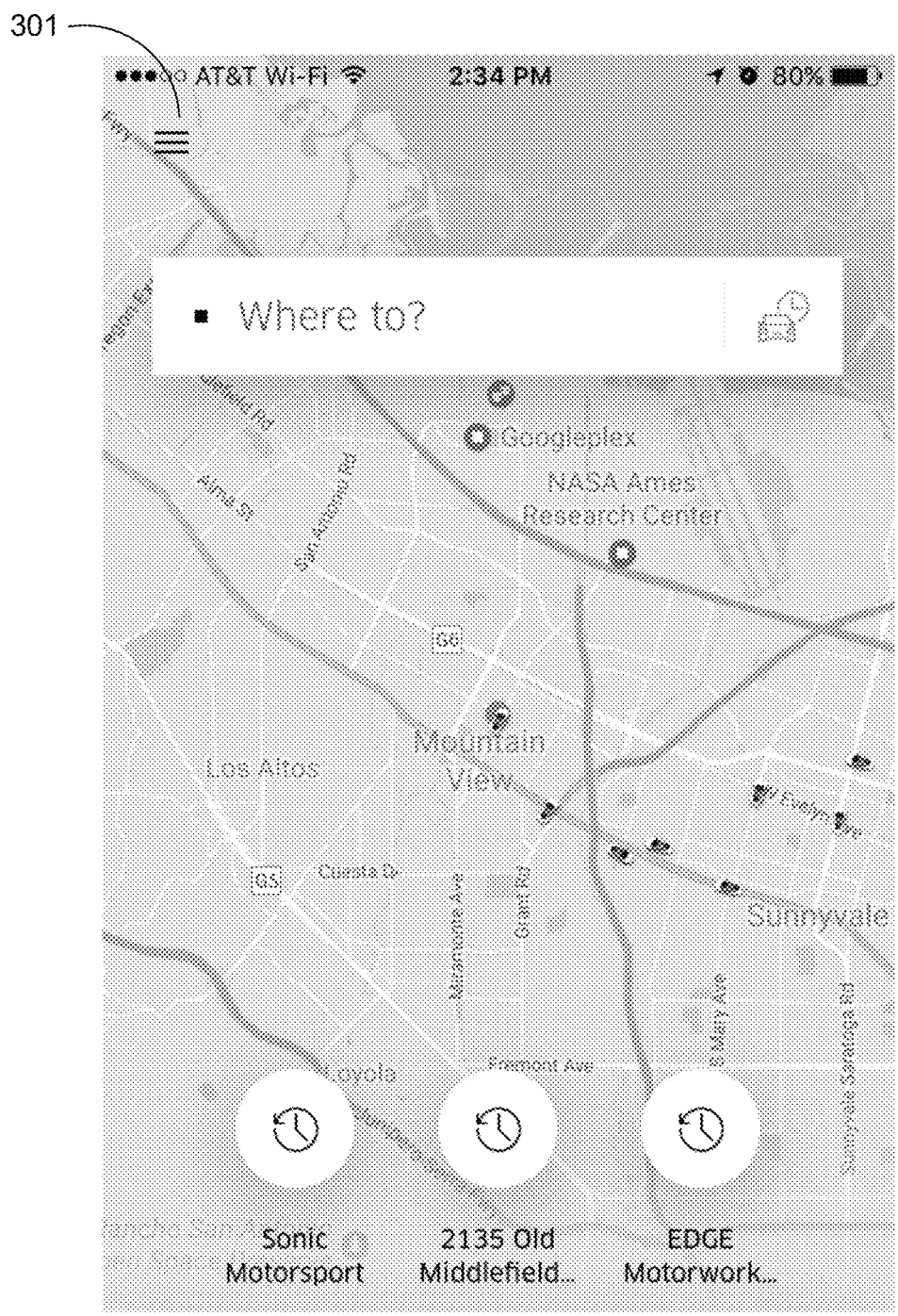
FIGS. 3A-3F illustrate user interfaces for reporting problems related to a service according to one embodiment.
Figure 3B:
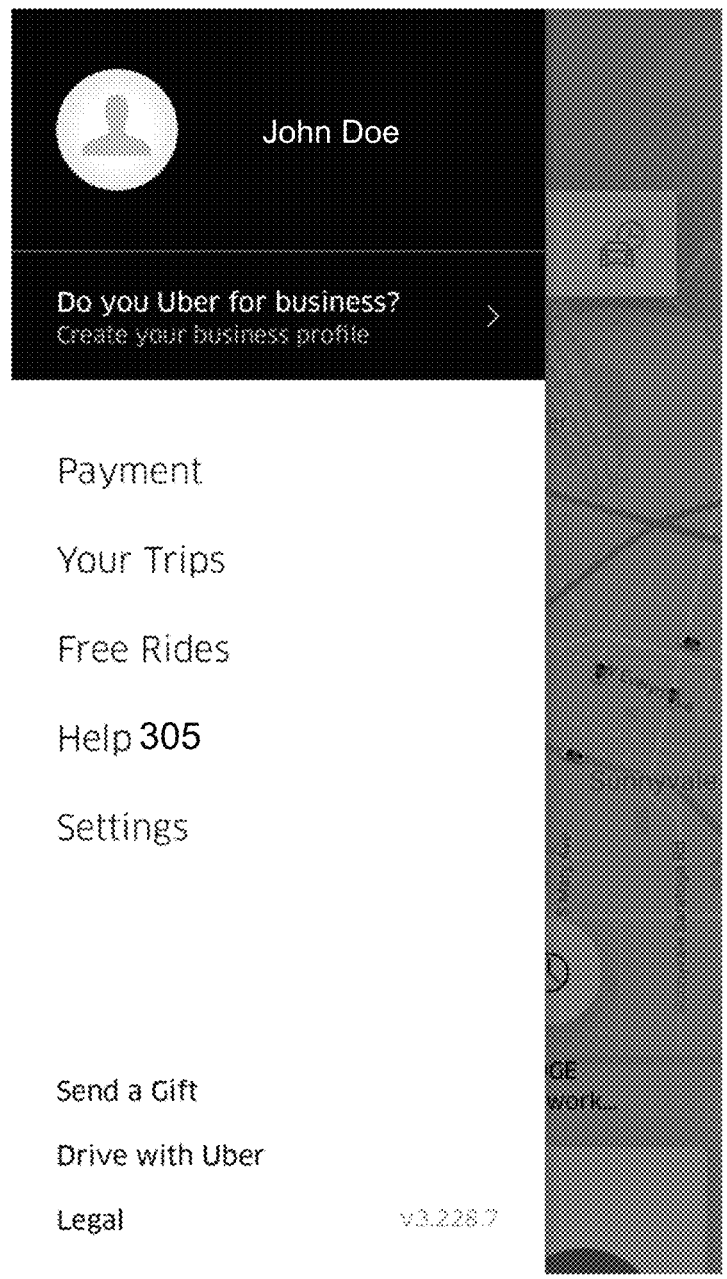

Referring to FIG. 3A, a user interface 300 of the service application 109 on the service requestor device 103 is shown. Generally, the user interface 300 is for entering the destination of a trip. However, the user interface 300 also includes a user interface element 301 for accessing a menu of the service application 109. Responsive to a selection of the user interface element 301, the service application 109 is updated to display a menu 303 of the service application 111 as shown in FIG. 3B.

Figure 3C:
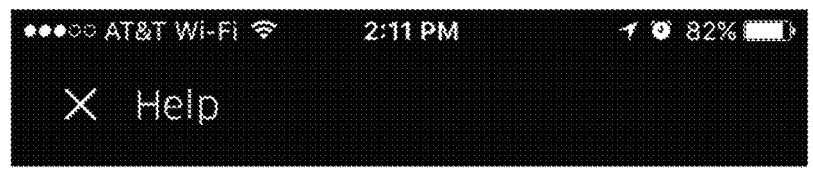
Figure 3C:
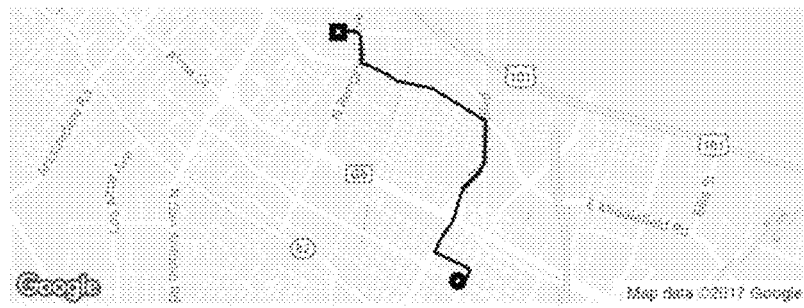

The menu 303 includes a help option 305. Responsive to a selection of the help option 305, the service application 111 displays the help user interface 304 shown in FIG. 3C. As shown in FIG. 3C, the help user interface 304 includes an option 305 to report an issue with the trip. Responsive to a selection of option 305, the help module 117 receives an indication of the selection of the option 305.

Figure 3D:
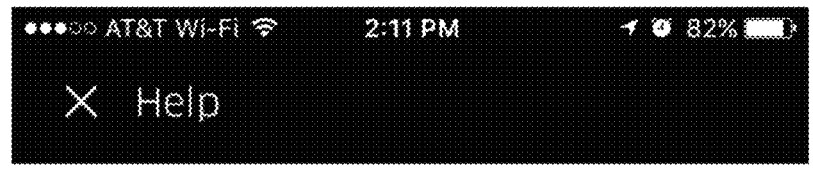
Figure 3D:
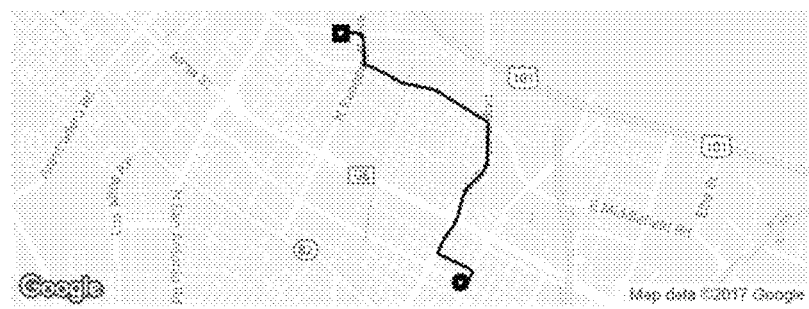

Responsive to the help module 117 receiving the indication of the selection of option 305, the help module 117 retrieves events related to user's most recent transport service from the event database 121. In one embodiment, the help module 117 provides a customized support interface that includes customer support categories that are associated with the events that occurred during the user's most recent transport service. FIG. 3D is one embodiment of a customized support interface 307 for the transport service shown in FIG. 2 that is displayed on the service application 111 in response to the user selection of the option 305 to report an issue with the transport service. Thus, the customized support interface 307 includes only the customer support categories that are relevant to the events that occurred during the transport service.

In one embodiment, the customized support interface 307 includes the customer support categories in the order that the associated events were retrieved by the help module 117 as set by a system administrator. For example, the customized support interface 307 includes category 309 to report that the user's promotional code was not applied, category 311 that the driver picked up the user late, category 313 that the user was dropped off at the wrong location, and category 315 that the driver sped during the trip. The user can select any of the customer support categories to report the event that is associated with the category to the map server 100 for processing. Alternatively, the customized support interface 307 may include the customer support categories in a random order.

In one embodiment, the help module 117 considers the user's sensitivity to different customer support categories when providing the customized support interface. The help module 117 may provide the customer support categories in the customized support interface in an ordering (e.g., a ranking) that is prioritized according to the user's sensitivity to the different customer support categories that are associated with the transport service. As described further below, each user has a different level of sensitivity to different types of customer support categories and the help module 117 accounts for the different levels of sensitivities of different users when providing the customized support interface. For example, a first user may be comfortable with the driver speeding during a trip whereas a second user may take issue with the driver speeding during a trip. Thus, the help module 117 may provide a customized support interface to the second user that includes a customer support category related to "dangerous driving—speeding" towards the top of the customized support interface whereas the help module 117 may provide a customized support interface to the first user where the customer support category related to "dangerous driving—speeding" is towards the bottom of the customized support interface.

In one embodiment, the help module 117 determines the ordering of the customer support categories that are associated with the events that occurred during the transport service based on a score assigned to each customer support category. The help module 117 assigns an event score E to each customer support category. For example, the help module 117 may assign a score of "1" to each customer support category that is associated with an event that occurred during the transport service in the event database 121. The help module 117 may assign a score of zero for all other customer support categories.

The help module 117 also determines for each customer support category a user sensitivity score $U_i$. The user sensitivity score for each customer support category describes how sensitive the user is to the customer support category. In one embodiment, help module 117 calculates the user sensitivity score $U_i$ for each customer support category based on the following equation:

$$U_i = \frac{NumberofSelections}{NumberofShowings}$$

In one embodiment, the variable "NumberofShowings" describes the total number of times that the particular customer support category was displayed to the user in customized support interfaces that the help module 117 provided in response to help requests from the service request device 103. For example, the "NumberofShowings" variable may describe the total amount of times the customer support category "I was dropped off at the wrong location" was displayed to the user in customized support interfaces. The variable "NumberofSelections" describes the total amount of times that the particular customer support category was selected by the user for reporting to the map server 100 when the customer support category was included in the customized support interfaces provided in response to help requests. For example, the variable "NumberofSelections" describes the total amount of times the customer support category "I was dropped off at the wrong location" was selected by the user.

For each customer support category, the help module 117 calculates a likelihood score $L_i$ that indicates a likelihood that the user will select the customer support category in the customized support interface for reporting to the map server 100. In one embodiment, the help module 117 calculates the likelihood score for each customer support category according to the following equation:

$$L_i = E_i \cdot U_i$$

Thus, the likelihood score $L_i$ for each customer support category is the product of the event score E for the customer support category and the user sensitivity score $U_i$ for the customer support category. In one embodiment, the help module 117 ranks the customer support categories according to likelihood score for each customer support category where a customer support category with a higher likelihood score is ranked higher than a customer support category with a lower likelihood score. In one embodiment, a customer support category with a higher likelihood score has a higher likelihood of being reported by the user to the map server 100 than a customer support category with a lower likelihood score. In one embodiment, the help module 117 generates a customized support interface that lists the customer support categories that are associated with the events that occurred during a transport service according to the ranking of the customer support categories. In another embodiment, the help module 117 may only include in the customized support interface the customer support categories that have likelihood scores above a threshold value. In one embodiment, the help module 117 may provide the list of customer support categories and each customer support category's associated ranking to the service application 111 on the location tracking device 101. The service application 111 then renders the customized support interface based on the customer support categories and the ranking received from the help module 117.

Figure 3E:
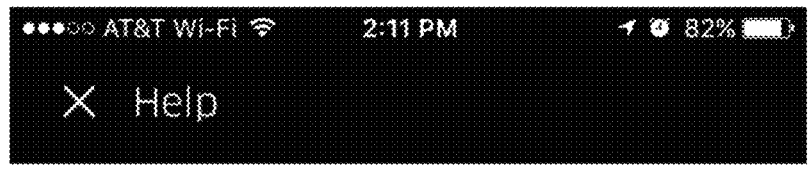
Figure 3E:
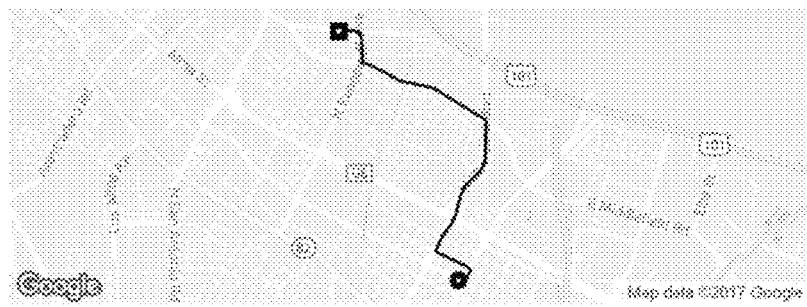

With respect to FIG. 3E, in one embodiment the customized support interface 308 includes the customer support categories associated with the events that occurred during the transport service that are ordered based on the user's sensitivity to the different customer support categories. As described in FIG. 2, the user was dropped off at the wrong drop off location. As shown in FIG. 3E, the first customer support category 319 for reporting an issue with the trip is "I was dropped off at the wrong location" indicating that the user is most sensitive to being dropped off at the wrong location. As mentioned above, FIG. 3D lists customer support categories in the order in which the associated events are received. The customized support interface 307 in FIG. 3D lists the customer support category "I was dropped off at the wrong location" as the third option rather than the first option as shown in FIG. 3E. The customized support interface 308 also includes a customer support category 321 for reporting that the user's promotional code was not applied for the trip, a customer support category 323 that the driver picked up the user late, and a customer support category 325 that the driver sped during the trip. The ordering of the different customer support categories shown in the customized support interface 308 is based on the user's sensitivity to the different types of customer support categories shown in the customized support interface 308. The user can select any of the customer support categories to report the event that is associated with the customer support category to the map server 100 for processing. If the help module 117 receives a selection of one of the categories from the service requestor device 103, the help module 117 may contact the service requestor device 103 investigating the user's reported grievance in more detail. For example, the help module 117 may send a notification to the service requestor device 103 requesting additional details regarding the user's reported grievance.

Figure 3F:

The customized support interface 307 also includes an option 317 to show more customer support categories that are not necessarily related to the events that occurred during the transport service if none of the customer support categories included in the customized support interface 307, 308 represent the type of issue that the user had with the transport service. FIG. 3F is one embodiment of a user interface 327 that includes a generic list of customer support categories that are each associated with different types of issues that the user may have experienced during the transport service. The options shown in user interface 327 are not based on the retrieved events associated with the user's most recent transport service. The user can select from one of the customer support categories in user interface 327 if the customized support interface 307, 308 does not include a customer support category that best matches the user's issue with the transport service.

As described above, the help module 117 provides the customized support interface to the location tracking device 101 of the user upon request to report an issue with a transport service. However, in other embodiments the help module 117 may proactively send a customized support interface to the location tracking device 101 of the user. For example, the map server 100 may track the transport service as it is occurring and may determine if a problem arises during the transport service. For example, if the map server 100 determines that the vehicle is making an unplanned stop or is veering off of the determined path of the transport service, the help module 117 may send a customized support interface to the location tracking device 101 that prompts the user for a response if help is needed. Thus, the user is not required to actively request to report an issue with a transport service.

II. Method for Providing a Customized Support Interface

Figure 4:
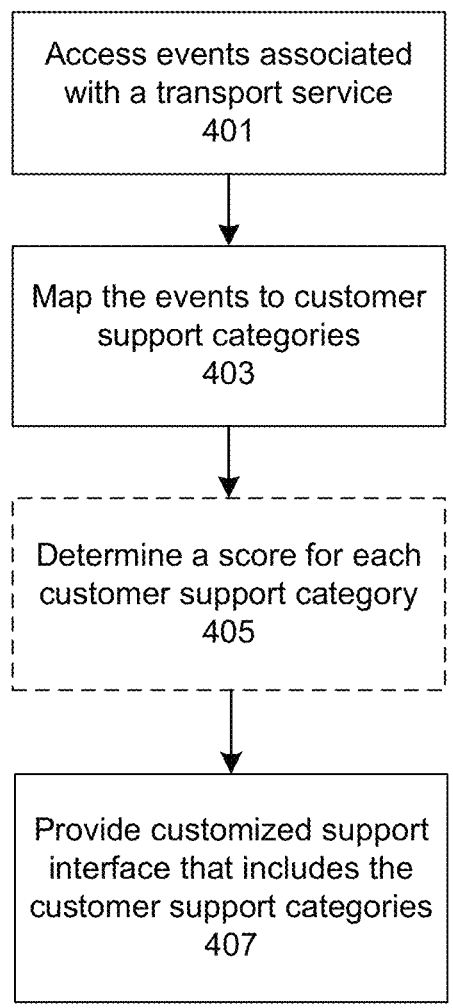
FIG. 4 is a method flow diagram for providing a customized support interface according to one embodiment.

FIG. 4 illustrates one embodiment of a method flow diagram for providing a customized support interface. Note that in other embodiments, steps other than those shown in FIG. 4 may be performed to determine the options for the customized support interface.

In one embodiment, the map server 100 accesses 401 events associated with a transport service. The map server 100 may map 403 the events to customer support categories. By mapping each event to a customer support category, the map server 100 normalizes each event. Each customer support category that is associated with an event that occurred during the transport service represents a grievance that the user may want to report to the map server 100. The map server 100 may optionally determine 405 a score for each customer support category. In one embodiment, the score for each customer support category is based on the user's sensitivity to the customer support category. The map server provides a customized support interface that includes the customer support categories 407 that are associated with the events that occurred during the transport service. In one embodiment, the customer support categories that are included in the customized support interface are ordered based on the scores for the customer support categories.

Although the embodiments disclosed herein are described with respect to providing a customized support interface based on a trip, the embodiments herein can be applied to any other type of service that may require a help interface. For example, a customized support interface can be implemented for a food delivery service according to the embodiments herein.

III. Hardware Components

Figure 5:
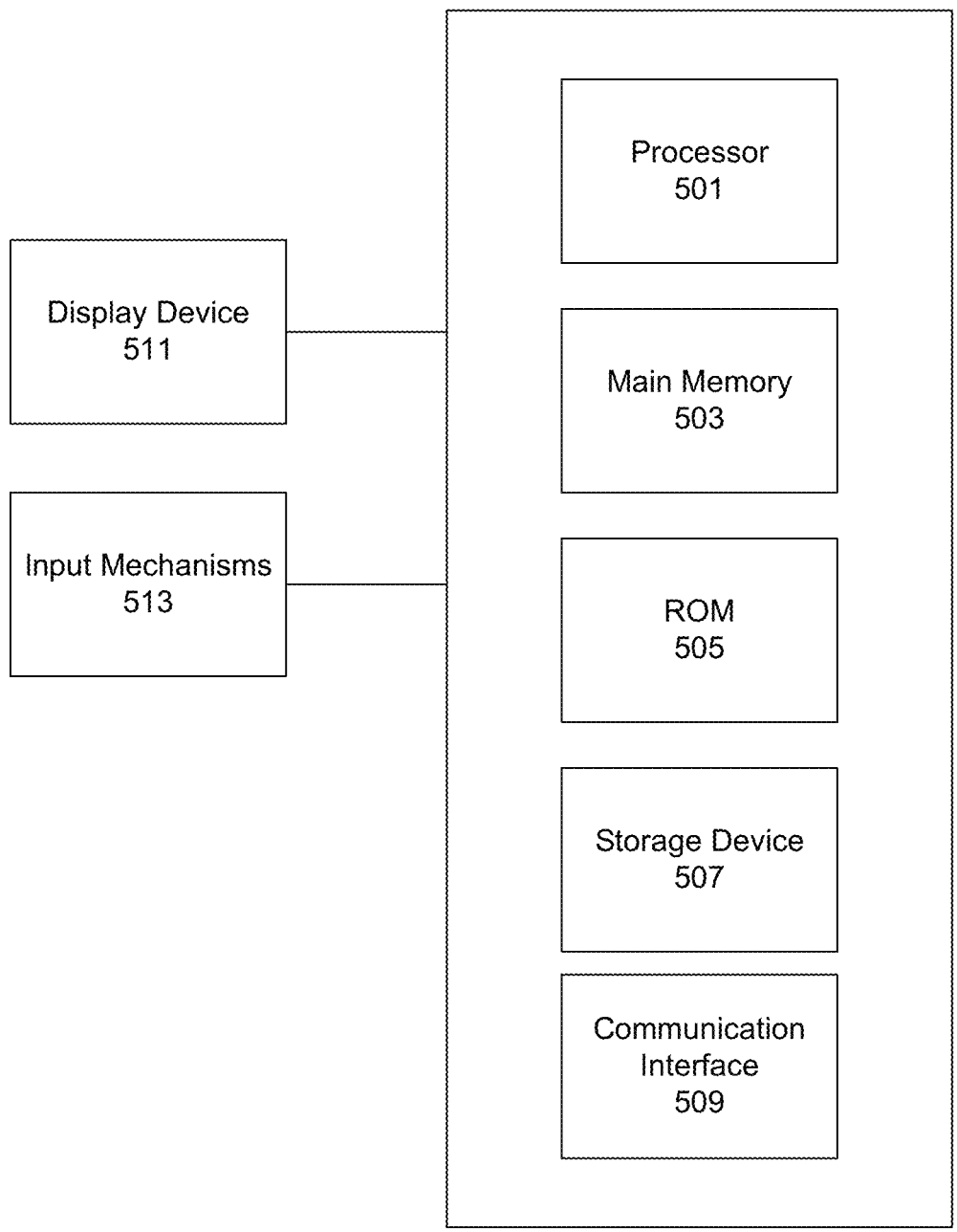
FIG. 5 illustrates a computer system that implements the embodiments herein according to one embodiment.

FIG. 5 is a diagram illustrating a computer system upon which embodiments described herein may be implemented. For example, in the context of FIG. 1, the map server 100 may be implemented using a computer system such as described by FIG. 5. The map server 100 may also be implemented using a combination of multiple computer systems as described by FIG. 5.

In one implementation, the map server 100 includes processing resources 501, main memory 503, read only memory (ROM) 505, storage device 507, and a communication interface 509. The map server 100 includes at least one processor 501 for processing information and a main memory 503, such as a random access memory (RAM) or other dynamic storage device, for storing information and instructions to be executed by the processor 501. Main memory 503 also may be used for storing temporary variables or other intermediate information during execution of instructions to be executed by processor 501. Map server 100 may also include ROM 505 or other static storage device for storing static information and instructions for processor 501. The storage device 507, such as a magnetic disk or optical disk, is provided for storing information and instructions.

The communication interface 509 can enable the map server 100 to communicate with one or more networks (e.g., cellular network) through use of the network link (wireless or wireline). Using the network link, the map server 100 can communicate with one or more computing devices, and one or more servers. In some variations, the map server 100 can be configured to receive sensor data (e.g., such as GPS data) from one or more location tracking devices via the network link. The sensor data can be processed by the processor 501 and can be stored in, for example, the storage device 507. The processor 501 can process the sensor data of a location tracking device in order to determine the path of travel of a transportation vehicle corresponding to the location tracking device. Extrapolated position information can be transmitted to one or more service requestor devices over the network 105 to enable the service applications 109 running on the service requestor devices to use the position information to present a visualization of the actual movement of the transportation vehicles.

The map server 100 can also include a display device 511, such as a cathode ray tube (CRT), an LCD monitor, or a television set, for example, for displaying graphics and information to a user. An input mechanism 513, such as a keyboard that includes alphanumeric keys and other keys, can be coupled to the map server 100 for communicating information and command selections to processor 501. Other non-limiting, illustrative examples of input mechanisms 513 include a mouse, a trackball, touch-sensitive screen, or cursor direction keys for communicating direction information and command selections to processor 501 and for controlling cursor movement on display device 511.

Examples described herein are related to the use of the map server 100 for implementing the techniques described herein. According to one embodiment, those techniques are performed by the map server 100 in response to processor 501 executing one or more sequences of one or more instructions contained in main memory 503. Such instructions may be read into main memory 503 from another machine-readable medium, such as storage device 507. Execution of the sequences of instructions contained in main memory 503 causes processor 501 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
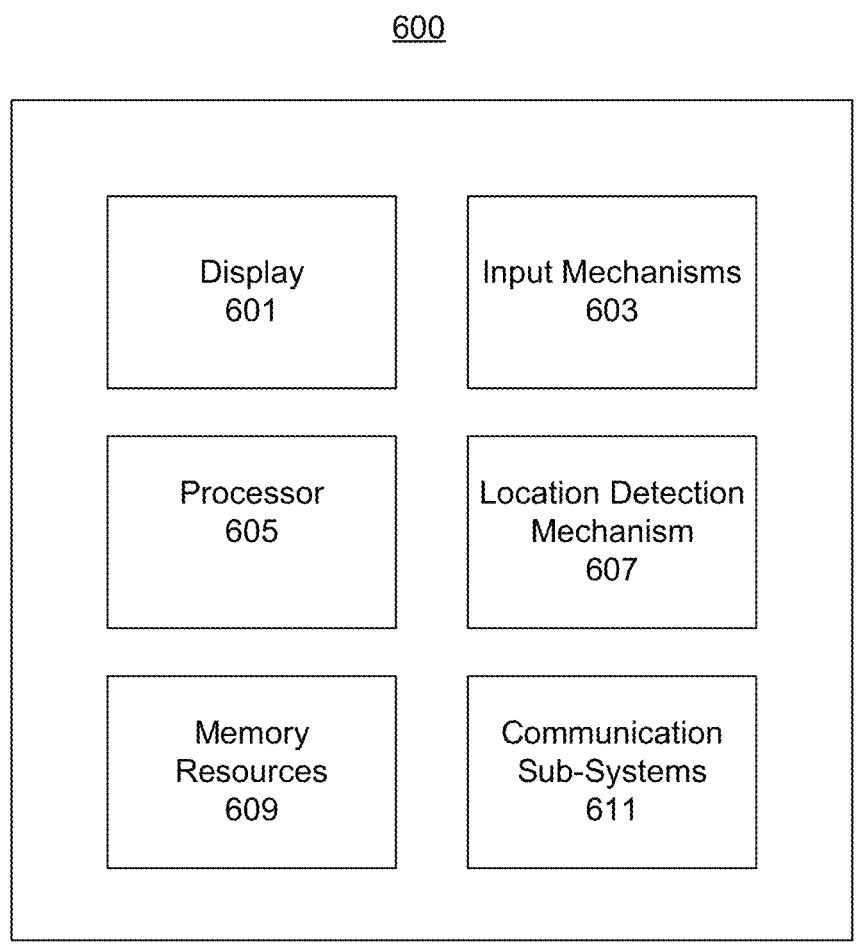
FIG. 6 illustrates a mobile computing device that implements the embodiments herein according to one embodiment.

FIG. 6 is a diagram illustrating a mobile computing device upon which embodiments described herein may be implemented. In one embodiment, a computing device 600 may correspond to a mobile computing device, such as a cellular device that is capable of telephony, messaging, and data services. The computing device 600 can correspond to each of the location tracking device 101 and the service requestor device 103. Examples of such devices include smartphones, handsets or tablet devices for cellular carriers. Computing device 600 includes a processor 605, memory resources 609, a display device 601 (e.g., such as a touch-sensitive display device), one or more communication sub-systems 611 (including wireless communication sub-systems), input mechanisms 603 (e.g., an input mechanism can include or be part of the touch-sensitive display device), and one or more location detection mechanisms (e.g., GPS module) 607. In one example, at least one of the communication sub-systems 611 sends and receives cellular data over data channels and voice channels.

The processor 605 is configured with software and/or other logic to perform one or more processes, steps and other functions described with implementations, such as those described herein. Processor 605 is configured, with instructions and data stored in the memory resources 609, to operate a service application as described herein. For example, instructions for operating the service application in order to display user interfaces can be stored in the memory resources 609 of the computing device 600.

From the viewpoint of a service provider, a service provider operating a location tracking device 101 can operate the service application 111 so that sensor data, such as location/position data, can be determined from the location detection mechanism 607. This location/position data can then be wirelessly transmitted to the system via the communication sub-systems 611. From the viewpoint of an end-user, a user can operate the service application 109 in order to receive position information of one or more transportation vehicles from the system (via the communication sub-systems 611).

The processor 605 can provide content to the display 601 by executing instructions and/or applications that are stored in the memory resources 609. In some examples, one or more user interfaces can be provided by the processor 605, such as a user interface for the service application, based at least in part on the received position information of the one or more transportation vehicles. While FIG. 6 is illustrated for a mobile computing device, one or more embodiments may be implemented on other types of devices, including full-functional computers, such as laptops and desktops (e.g., PC).

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for determining presentation elements of a customized support operator interface, the method comprising:
   accessing, by at least one processor, events that occurred during a user's trip from a first location to a second location;
   selecting, from a plurality of customer support categories, a set of customer support categories associated with a distinct issue that the user experienced during the trip;
   mapping the events to the selected set of customer support categories;
   ranking the customer support categories included in the selected set of customer support categories based on a sensitivity of the user to each of the customer support categories;
   automatically providing, to a client device of the user, a customized support interface that includes the set of customer support categories that are mapped to the events that occurred during the user's trip, the customer support categories included in the selected set of customer support categories are user selectable within the customized support interface and are ordered in the customized support interface according to the ranking;
   receiving, from the client device of the user, a selection of one or more of the customer support categories within the selected set of customer support categories that are included in the customized support interface from the client device; and
   contacting the client device of the user regarding the selected one or more customer support categories.

2. The computer-implemented method of claim 1, wherein ranking the customer support categories included in the selected set of customer support categories based on the sensitivity comprises:
   determining a score for each of the customer support categories included in the selected set of customer support categories, the score for each of the customer support categories based on a ratio of a total amount of times that the user selected the customer support category across a plurality of different trips and a total amount of times that the customer support category was displayed to the user across the plurality of different trips.

3. The computer-implemented method of claim 2, wherein the selected set of customer support categories included in the customized support interface all have scores above a threshold.

4. The computer-implemented method of claim 1, further comprising:
   receiving a request from the client device to report an issue with the trip; and
   wherein the customized support interface is provided to the client device responsive to the request.

5. The computer-implemented method of claim 1, wherein the customized support interface is provided to the client device of the user during the trip from the first location to the second location without the client device of the user requesting the customized support interface.

6. The computer-implemented method of claim 1, wherein the selected set of customer support categories comprise at least one of reckless driving by a driver of a vehicle that is being used to transport the user during the trip, the user being picked up at the first location which is different from a requested pick up location, the user being dropped off at the second location which is different from a requested drop off location, an accident that occurred during the trip, an item left by the user in the vehicle, or an issue with a cost of the trip.

7. The computer-implemented method of claim 1, wherein the customized support interface further includes a map depicting the user's trip from the first location to the second location during which the events took place.

8. A computer program product comprising a non-transitory computer readable storage medium storing executable code for determining presentation elements of a customized support operator interface, the code when executed by one or more computer processors causes the one or more computer processors to perform steps comprising:
   accessing, by at least one processor, events that occurred during a user's trip from a first location to a second location;
   selecting, from a plurality of customer support categories, a set of customer support categories associated with a distinct issue that the user experienced during the trip;
   mapping the events to the selected set of customer support categories;
   ranking the customer support categories included in the selected set of customer support categories based on a sensitivity of the user to each of the customer support categories;
   automatically providing, to a client device of the user, a customized support interface that includes the set of customer support categories that are mapped to the events that occurred during the user's trip, the customer support categories included in the selected set of customer support categories are user selectable within the customized support interface and are ordered in the customized support interface according to the ranking;
   receiving, from the client device of the user, a selection of one or more of the customer support categories within the selected set of customer support categories that are included in the customized support interface from the client device; and
   contacting the client device of the user regarding the selected one or more customer support categories.

9. The computer program product of claim 8, wherein ranking the customer support categories included in the selected set of customer support categories based on the sensitivity comprises:

determining a score for each of the customer support categories included in the selected set of customer support categories, the score for each of the customer support categories based on a ratio of a total amount of times that the user selected the customer support category across a plurality of different trips and a total amount of times that the customer support category was displayed to the user across the plurality of different trips.

10. The computer program product of claim 9, wherein the selected set of customer support categories included in the customized support interface all have scores above a threshold.

11. The computer program product of claim 8, wherein the code when executed by the one or more computer processors further causes the one or more computer processors to perform steps comprising:
receiving a request from the client device to report an issue with the trip; and
wherein the customized support interface is provided to the client device responsive to the request.

12. The computer program product of claim 8, wherein the customized support interface is provided to the client device of the user during the trip from the first location to the second location without the client device of the user requesting the customized support interface.

13. The computer program product of claim 8, wherein the selected set of customer support categories comprise at least one of reckless driving by a driver of a vehicle that is being used to transport the user during the trip, the user being picked up at the first location which is different from a requested pick up location, the user being dropped off at the second location which is different from a requested drop off location, an accident that occurred during the trip, an item left by the user in the vehicle, or an issue with a cost of the trip.

14. A computer system for determining presentation elements of a customized support operator interface, the computer system comprising:
a computer processor; and
a non-transitory computer-readable storage medium storing executable code, the code when executed by the computer processor causes the computer processor to perform steps comprising:
accessing, by at least one processor, events that occurred during a user's trip from a first location to a second location;
selecting, from a plurality of customer support categories, a set of customer support categories associated with a distinct issue that the user experienced during the trip;
mapping the events to the selected set of customer support categories;
ranking the customer support categories included in the selected set of customer support categories based on a sensitivity of the user to each of the customer support categories;
automatically providing, to a client device of the user, a customized support interface that includes the set of customer support categories that are mapped to the events that occurred during the user's trip, the customer support categories included in the selected set of customer support categories are user selectable within the customized support interface and are ordered in the customized support interface according to the ranking;
receiving, from the client device of the user, a selection of one or more of the customer support categories within the selected set of customer support categories that are included in the customized support interface from the client device; and
contacting the client device of the user regarding the selected one or more customer support categories.

15. The computer system of claim 14, wherein ranking the customer support categories included in the selected set of customer support categories based on the sensitivity comprises:
determining a score for each of the customer support categories included in the selected set of customer support categories, the score for each of the customer support categories based on a ratio of a total amount of times that the user selected the customer support category across a plurality of different trips and a total amount of times that the customer support category was displayed to the user across the plurality of different trips.

16. The computer system of claim 15 wherein the selected set of customer support categories included in the customized support interface all have scores above a threshold.

17. The computer system of claim 14, wherein the code when executed by the computer processor further causes the computer processor to perform steps comprising:
receiving a request from the client device to report an issue with the trip; and
wherein the customized support interface is provided to the client device responsive to the request.

18. The computer system of claim 14, wherein the customized support interface is provided to the client device of the user during the trip from the first location to the second location without the client device of the user requesting the customized support interface.

* * * * *